United States Patent
Lin et al.

(10) Patent No.: US 9,118,390 B2
(45) Date of Patent: Aug. 25, 2015

(54) CELL PHONE PROTECTION COVER STRUCTURE

(71) Applicants: Chia-Hao Lin, New Taipei (TW); Chi-Vun Steven Bau, Taipei (TW)

(72) Inventors: Chia-Hao Lin, New Taipei (TW); Chi-Vun Steven Bau, Taipei (TW)

(*) Notice: Subject to any disclaimer, the term of this patent is extended or adjusted under 35 U.S.C. 154(b) by 97 days.

(21) Appl. No.: 14/096,038

(22) Filed: Dec. 4, 2013

(65) Prior Publication Data

US 2015/0155902 A1 Jun. 4, 2015

(51) Int. Cl.
*H04M 1/00* (2006.01)
*H04B 1/3888* (2015.01)
*H04M 1/02* (2006.01)

(52) U.S. Cl.
CPC ........... *H04B 1/3888* (2013.01); *H04M 1/0202* (2013.01)

(58) Field of Classification Search
CPC ....... H04M 1/04; H04M 1/0214; H04M 1/18; A45C 11/00; A45C 2011/002; A45C 2200/15; G03B 17/00; G06F 1/1628; G06F 1/1669; H01H 13/704; H01H 13/83; H01H 13/86; H01H 13/88; H01H 2009/187
USPC ............... 455/575, 575.8, 556.1, 557, 575.1, 455/575.6, 90.3; 206/736, 320, 45.23, 472, 206/474, 752, 45.24; 220/669; 362/23.03; 361/679.01
See application file for complete search history.

(56) References Cited

U.S. PATENT DOCUMENTS

| | | | | |
|---|---|---|---|---|
| 8,132,670 B1* | 3/2012 | Chen | | 206/320 |
| 8,899,415 B2* | 12/2014 | McCosh et al. | | 206/320 |
| 2006/0160586 A1* | 7/2006 | Cheng | | 455/575.8 |
| 2010/0061714 A1* | 3/2010 | Gao et al. | | 396/448 |
| 2010/0294683 A1* | 11/2010 | Mish et al. | | 206/320 |
| 2011/0266291 A1* | 11/2011 | Fan | | 220/669 |
| 2011/0304962 A1* | 12/2011 | Su | | 361/679.01 |
| 2012/0085679 A1* | 4/2012 | Kim et al. | | 206/736 |
| 2013/0170110 A1* | 7/2013 | Lee | | 361/679.01 |
| 2013/0264235 A1* | 10/2013 | Lin | | 206/320 |
| 2014/0071654 A1* | 3/2014 | Chien et al. | | 362/23.03 |
| 2014/0190844 A1* | 7/2014 | Hsieh | | 206/45.23 |

* cited by examiner

*Primary Examiner* — Tan Trinh
(74) *Attorney, Agent, or Firm* — Raymond Y. Chan; David and Raymond Patent Firm

(57) ABSTRACT

A cell phone protection cover structure includes a battery cover, a support plate, a leather cover, and a protection plate. The battery cover is mounted to the back of the cell phone. The battery cover has a thick portion and a thin portion. The thick portion is directly adhered to the leather cover. The support plate corresponds to the thin portion of the battery cover and is adhered to the leather cover. The leather cover has a connecting section to connect with the protection plate. The support plate can be coupled to the thin portion of the battery cover to form the same plane with the thick portion. The support plate can be opened at an angle, so that the battery cover, the support plate and the protection plate form a triangle support for the cell phone to be placed obliquely.

3 Claims, 4 Drawing Sheets

CELL PHONE PROTECTION COVER STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a cell phone protection cover structure, and more particularly to a cell phone protection cover structure by using a battery cover having a thick portion and a thin portion. The thin portion is adapted to connect with a support plate to form the same plane with the thick portion. The support plate can be opened at an angle to form a support. There is no need to provide an additional plastic protection cover for supporting the cell phone placed obliquely. The whole protection cover is lighter and thinner.

2. Description of Related Arts

These days, hand-held electronic devices become more and more popular, such as a smart phone. The smart phone has a touch screen and provides multiple functions, such as surfing, taking a photograph, playing movies and music and so on. Except telephone functions, the cell phone can be used to play movies. When watching a movie, it is necessary to adjust the screen of the cell phone at a proper angle for the user to watch the movie conveniently. As shown in FIG. 1 and FIG. 2, a conventional cell phone protection cover comprises a plastic cover 11 and a leather cover 13. The plastic cover 11 has an accommodation room 12 to accommodate a cell phone 10. The leather cover 13 has an attachment portion 14, a folding line 15, a support portion 16, a connecting portion 17, and a protection portion 18. The attachment portion 14 is adhered to one side of the back of the plastic cover 11. The folding line 15 is disposed between the attachment portion 14 and the support portion 16 for the support portion 16 to be bent outward or to approach the plastic cover 11. The connecting portion 17 and the protection portion 18 extend from another side edge of the support portion 16. The leather cover 13 can be bent to form a triangle for supporting the plastic cover 11, so that the cell phone 10 can be placed obliquely for watching a movie. The cell phone 10 is protected by the plastic cover 11 and the leather cover 13 so the entire protection cover is thick. This is not convenient to carry. In addition, the plastic cover 11 covers the cell phone 10. It may cover the original shape of the cell phone 10. FIG. 3 and FIG. 4 show another conventional protection cover. The protection cover comprises a battery cover 23 of a cell phone 20, a connecting section 25, and a protection plate 26 which are integrally formed. The cell phone 20 has a battery 22 and hook recesses 21. The battery cover 23 has hooks 24 corresponding to the hook recesses 21. The hooks 24 are inserted in the hook recesses 21 when the cell phone 20 is coupled to the protection cover. The connecting section 25 is for bending the protection plate 26 to cover the screen of the cell phone 20. It is not necessary to provide an additional plastic cover for covering the cell phone 20, such that the cell phone protection cover is thinner. However, the battery cover 23 is integrally formed with the protection plate 26. The protection plate 26 cannot be bent to support the cell phone 20 to be placed obliquely for watching a movie.

Accordingly, the inventor of the present invention has devoted himself based on his many years of practical experiences to solve this problem.

SUMMARY OF THE PRESENT INVENTION

The primary object of the present invention is to provide a cell phone protection cover structure which is more convenient for use. A battery cover of a cell phone has a thick portion and a thin portion. The thick portion is directly adhered to a light, thin and soft leather cover to decrease the entire thickness of the cell phone. A support plate is adhered to the soft leather cover to support the cell phone when it is opened. When it is closed, the support plate is flat coupled to the thin portion and has the same plane with the thick portion. The cell phone doesn't need a plastic protection cover for placing the cell phone at an angle, so the entire thickness of the cell phone can be decreased to take along conveniently. Besides, the original shape of the cell phone won't be covered to show the feature of the product.

DETAILED DESCRIPTION OF THE PREFERRED EMBODIMENT

Figure 1:
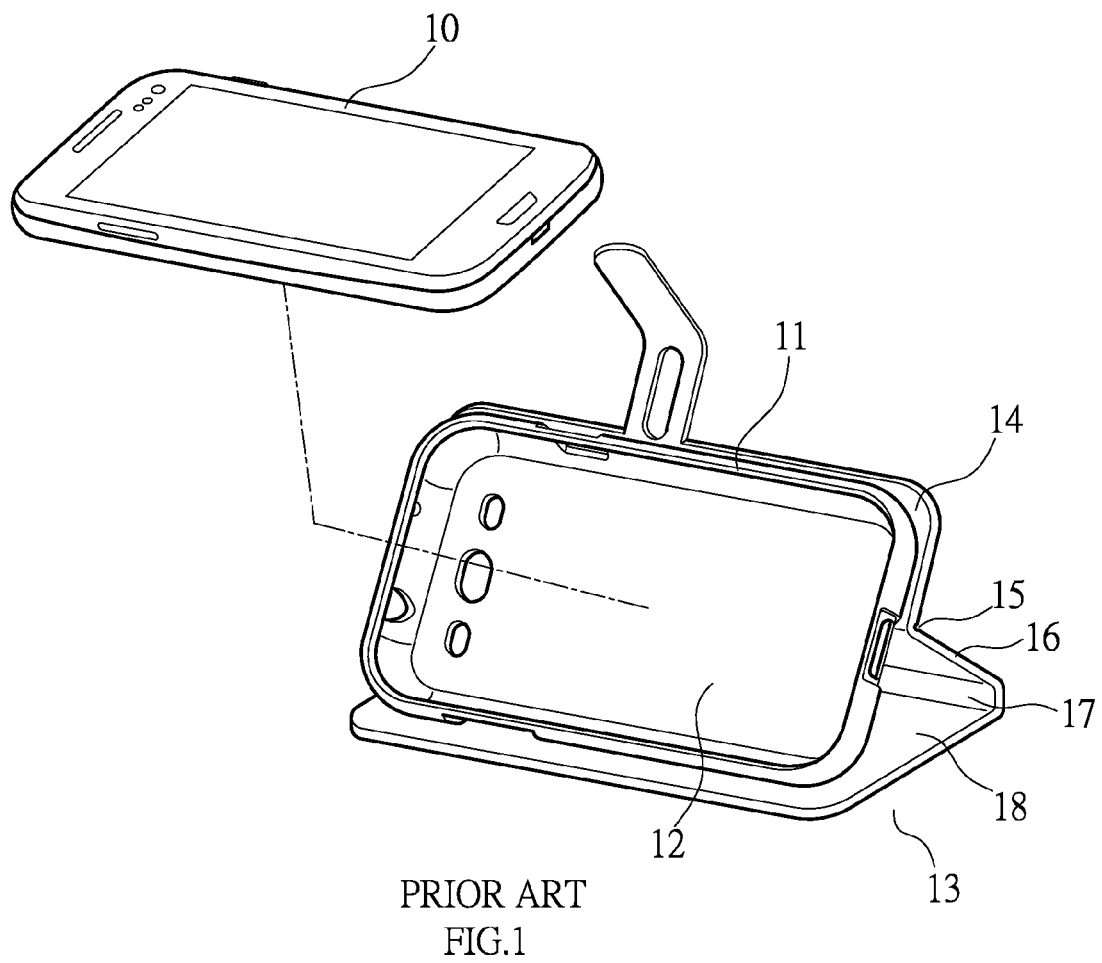
FIG. 1 is a perspective view of a conventional cell phone protection cover.
Figure 2:
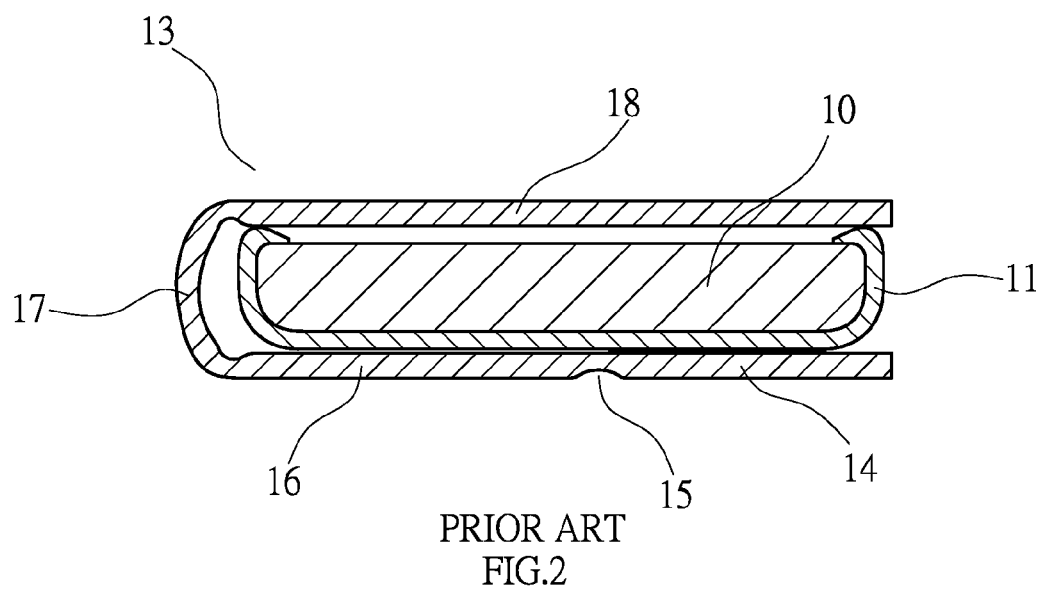
FIG. 2 is a sectional view of FIG. 1.
Figure 3:
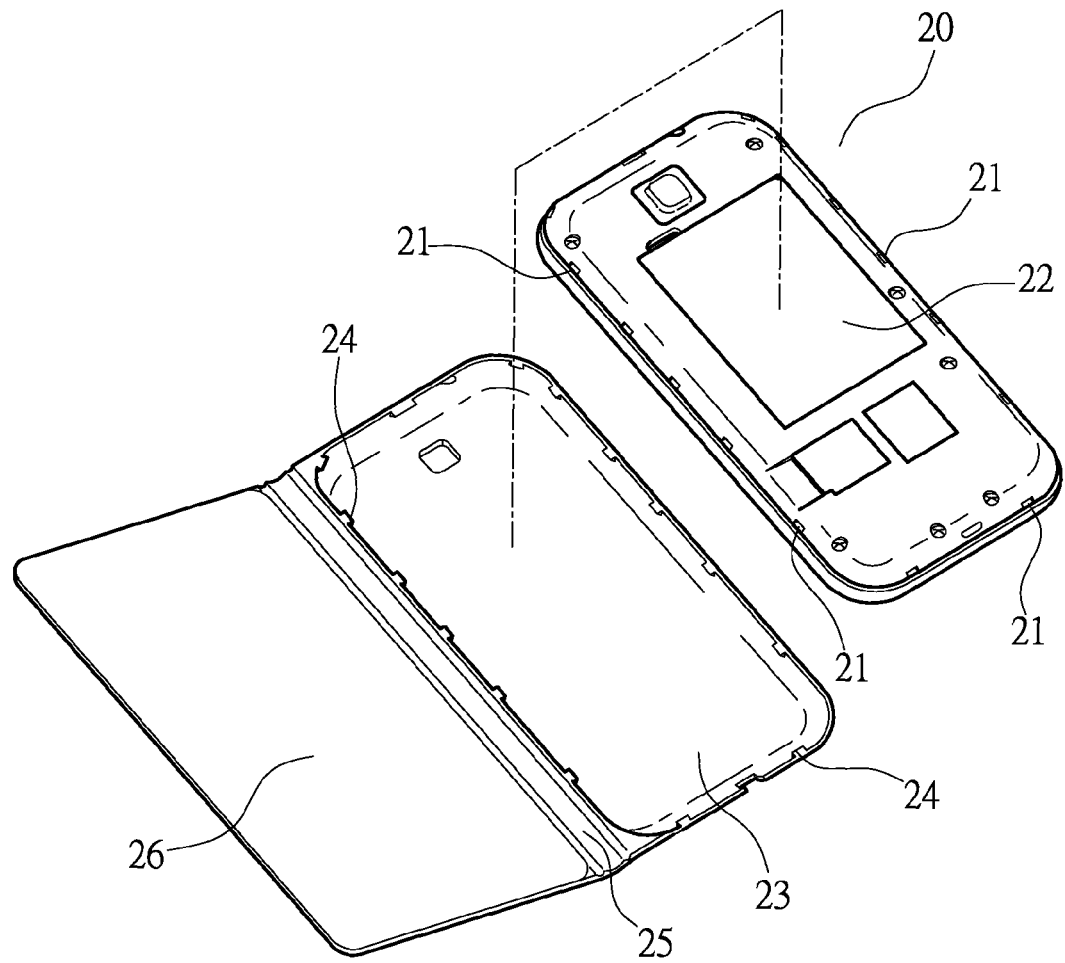
FIG. 3 is a perspective view of another conventional cell phone protection cover.
Figure 4:
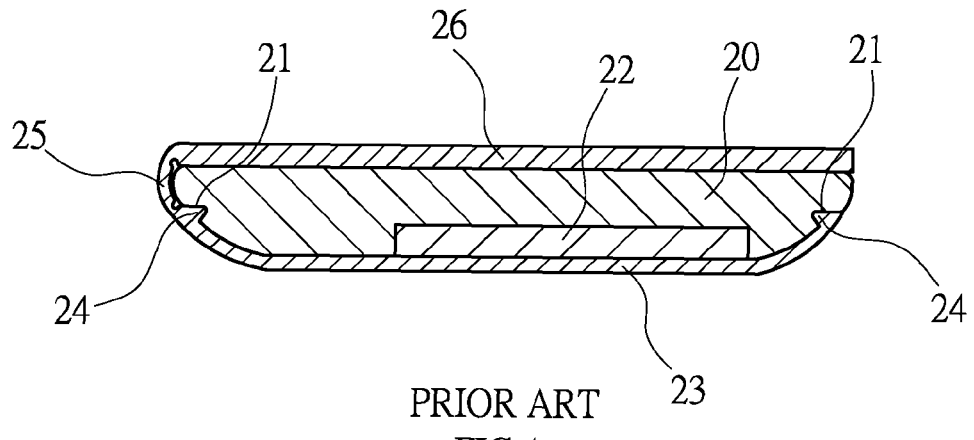
FIG. 4 is a sectional view of FIG. 3.
Figure 5:
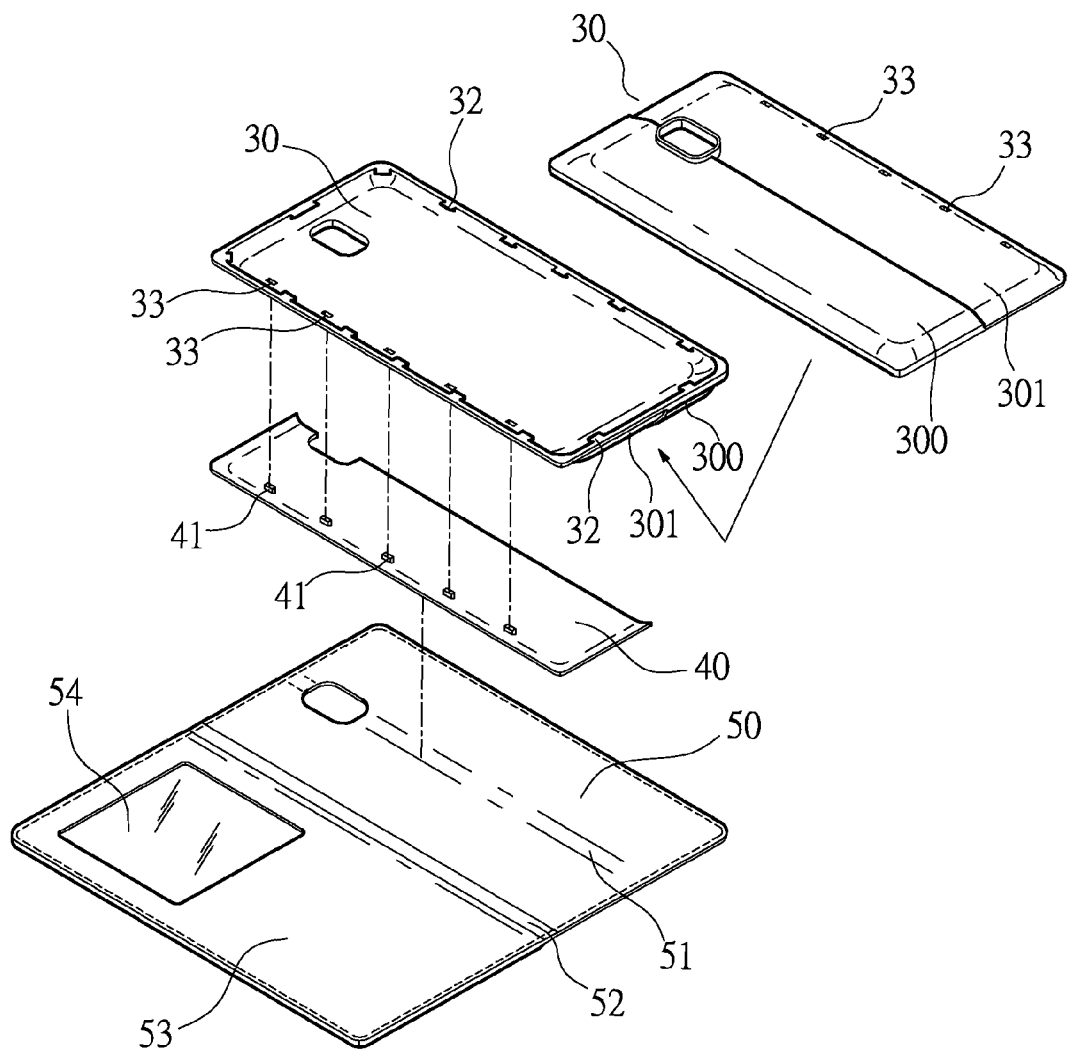
FIG. 5 is an exploded view according to a preferred embodiment of the present invention.
Figure 6:
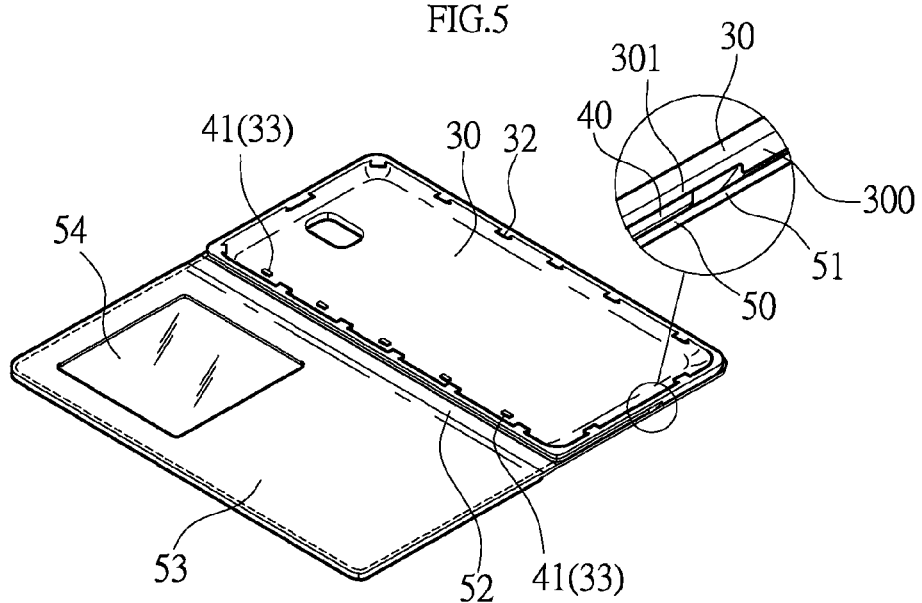
FIG. 6 is an assembled perspective view according to the preferred embodiment of the present invention.

Embodiments of the present invention will now be described, by way of example only, with reference to the accompanying drawings.

As shown in FIG. 5, FIG. 6, FIG. 7 and FIG. 8, the cell phone protection cover structure according to a preferred embodiment of the present invention comprises a battery cover 30, a support plate 40, a leather cover 50, and a protection plate 53. The battery cover 30 has a plurality of hooks 32 around the circumferential edge for engaging with hook recesses 21 at the back of a cell phone. The rear of the battery cover 30 has a thick portion 300 and a thin portion 301. The thick portion 300 is directly adhered to the leather cover 50. The outer side edge of the thin portion 301 has a plurality of positioning holes 33 which are arranged in a line. The support plate 40 is adhered to the leather cover 50 and corresponds in shape to the thin portion 301 of the battery cover 30. The support plate 40 has a plurality of positioning protrusions 41 which are arranged in a line. The positioning protrusions 41 are inserted into the positioning holes 33, so that the support plate 40 is exactly attached to the thin portion 301 to form the same plane with the thick portion 300. The leather cover 50 has a connecting section 52 to connect with the protection plate 53. The leather cover 50 is to cover the cell phone from the back of the battery cover 30 to the front of the cell phone 20. A gap is defined between the thick portion 300 and the support plate 40. The leather cover 50 has a flexible section 51 corresponding in position to the gap for curving, deforming, opening or closing the support plate 40, such that the support plate 40 can be closed and coupled to the thin portion 301 of the battery cover 30 or opened at an angle to form a support for placing the cell phone 200 obliquely. The cell phone protection cover of the present invention is thinner than the prior art.

Figure 7:
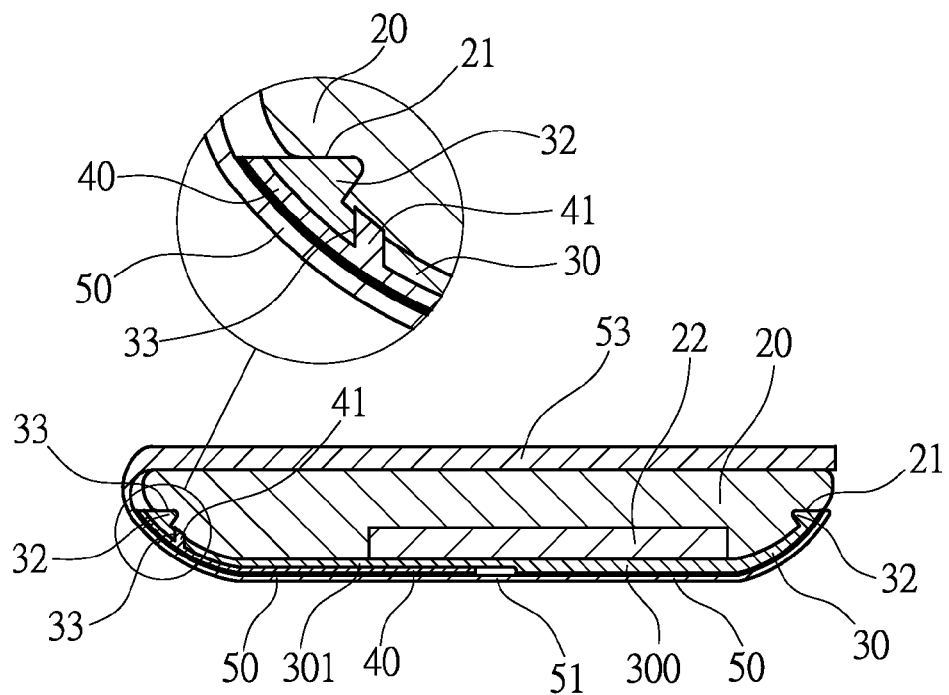
FIG. 7 is an assembled sectional view according to the preferred embodiment of the present invention.
Figure 8:
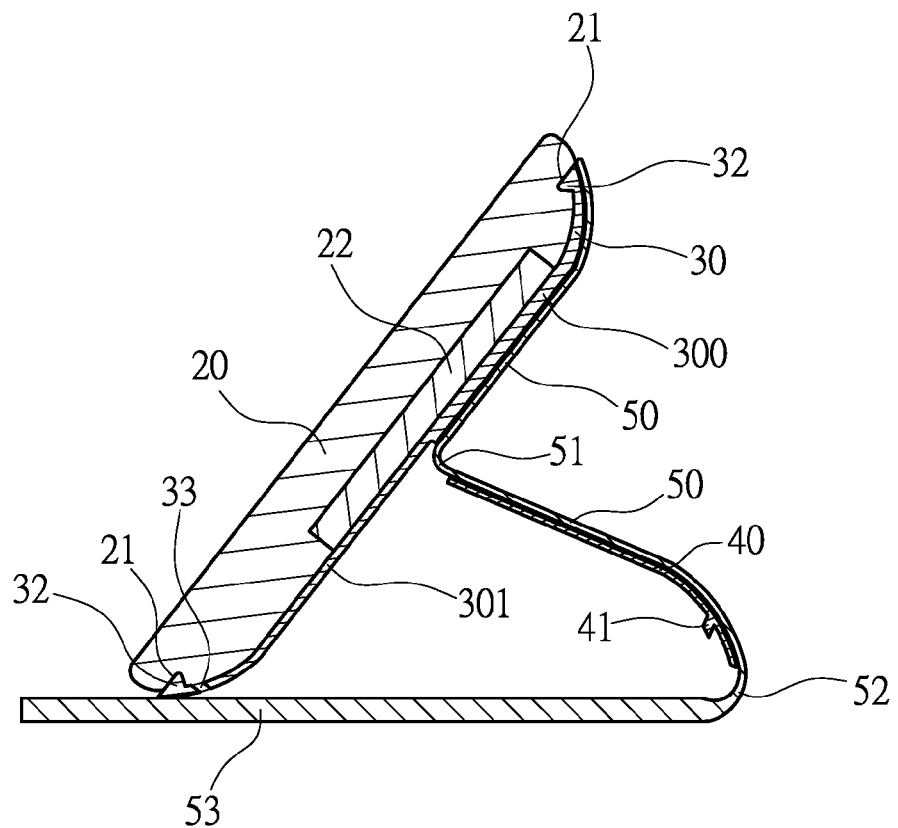
FIG. 8 is a sectional view of the preferred embodiment of the present invention in a support state.

The battery cover 30 of the present invention is an essential protection cover to protect the parts inside the cell phone 20 and to fix a battery 22. The circumferential edge of the back of the cell phone 20 has a plurality of hook recesses 21 for engagement of the hooks 24 provided at the circumferential edge of the battery cover 30. The support plate 40 is attached to one side of the battery cover 30. The battery cover 30 has a thick portion 300 at one side and a thin portion 301 at another side thereof, therefore, after the battery cover 30 and the support plate 40 are assembled, they are at the same plane, as shown in FIG. 7. The leather cover 50 is soft leather, without any hard plate embedded therein. After the thick portion 300 of the battery cover 30 is adhered to the leather cover 50, the change of the thickness is very slight. After the support plate 40 is adhered to the leather cover 50, the leather cover 50 has a support force, as shown in FIG. 8. When the support plate 40 is in a closed state, the positioning protrusions 41 of the support plate 40 are inserted into the positioning holes 33 of the battery cover 30 so that the support plate 40 is firmly positioned to the thin portion 301 of the battery cover 30 and not slidable. A gap is defined between the thick portion 300 and the support plate 40. The leather cover 50 has a flexible section 51 corresponding in position to the gap. The flexible section 51 is for the leather cover 50 to extend and curve when the support plate 40 is opened, preventing the surface of the leather cover 50 from being broken and damaged. When the support plate 40 is in an open state, the flexible section 51 can keep the leather cover 50 curved to open the support plate 40 at an angle to form a triangle for supporting the cell phone 200 placed obliquely so as to watch a movie. The protection plate 53 has a see-through window 54 for seeing the message from the cell phone 20, without opening the protection plate 53. This is convenient for use.

The present invention has the following effects and advantages.

1. The present invention uses the leather cover 50 to bind the thick portion 300 of the battery cover 30 of the cell phone. There is no need to provide a thick plastic protection cover, so the thickness is less after the cell phone is mounted in the protection cover. It is convenient to place the cell phone in the packet or the bag.

2. After the support plate 40 is adhered to the leather cover 50, the leather cover 50 has a support force, without a hard plate embedded therein.

3. The present invention doesn't have other plastic protection cover, so the contour of the cell phone won't be covered. It can show the feature of the product fully and protect the cell phone.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A cell phone protection cover structure, comprising a battery cover, a support plate, a leather cover, and a protection plate, the battery cover having a plurality of hooks around a circumferential edge thereof for engaging with hook recesses at the back of a cell phone, a rear side of the battery cover having a thick portion and a thin portion, the thick portion being adhered to the leather cover, an outer side edge of the thin portion having a plurality of positioning holes which are arranged in a line, the support plate being adhered to the leather cover and corresponding in shape to the thin portion of the battery cover, the support plate having a plurality of positioning protrusions which are arranged in a line, the positioning protrusions being able to be inserted into the positioning holes, the leather cover having a connecting section to connect with the protection plate, the leather cover being adapted to cover the cell phone from the back of the battery cover to the front of the cell phone.

2. The cell phone protection cover structure as claimed in claim 1, wherein the support plate is attached to the thin portion to form the same plane with the thick portion.

3. The cell phone protection cover structure as claimed in claim 1, wherein a gap is defined between the thick portion and the support plate, and the leather cover has a flexible section corresponding in position to the gap for curving, opening or closing the support plate.

\* \* \* \* \*